US011847804B1

(12) United States Patent
Ivanov et al.

(10) Patent No.: US 11,847,804 B1
(45) Date of Patent: Dec. 19, 2023

(54) SYSTEM AND METHOD FOR MATCHING A VOICE SAMPLE TO A FACIAL IMAGE

(71) Applicant: Corsound AI Ltd, Tel Aviv (IL)

(72) Inventors: Daniil Ivanov, Tel Aviv (IL); Arkady Krishtul, Tel Aviv (IL)

(73) Assignee: Corsound AI Ltd, Tel Aviv (IL)

( * ) Notice: Subject to any disclaimer, the term of this patent is extended or adjusted under 35 U.S.C. 154(b) by 0 days.

(21) Appl. No.: 18/321,908

(22) Filed: May 23, 2023

(51) Int. Cl.
*G06K 9/62* (2022.01)
*G06V 40/70* (2022.01)
*G06V 40/16* (2022.01)
*G10L 17/10* (2013.01)
*G06V 10/776* (2022.01)
*G10L 17/04* (2013.01)
*G10L 17/18* (2013.01)
*G06V 10/82* (2022.01)
*G06V 40/50* (2022.01)

(52) U.S. Cl.
CPC ............ *G06V 40/70* (2022.01); *G06V 10/776* (2022.01); *G06V 10/82* (2022.01); *G06V 40/172* (2022.01); *G06V 40/50* (2022.01); *G10L 17/04* (2013.01); *G10L 17/10* (2013.01); *G10L 17/18* (2013.01)

(58) Field of Classification Search
CPC ...... G06V 40/16–40/179; G06V 40/70; G06V 10/70; G06V 10/778–10/7796; G06V 10/82; G06V 10/454; G06V 30/18057; G10L 17/00–17/26; G06T 3/4046; G06T 9/002; G06T 2207/20081; G06T 2207/20084
See application file for complete search history.

(56) References Cited

PUBLICATIONS

Boutros et al., "Self-restrained triplet loss for accurate masked face recognition", Pattern Recognition 124 (2022) 108473, Elsevier publication, 2021 copyright, pp. 1-13. (Year: 2022).*
Rui Wang et al., "Learning Discriminative Joint Embeddings for Efficient Face and Voice Association", SIGIR '20, Jul. 25-30, 2020, Virtual Event, China, In Proceedings of the 43rd International ACM SIGIR Conference on Research and Development in Information Retrieval (SIGIR '20), pp. 1881-1884. (Year: 2020).*
Speaker Verification with xvector embeddings on Voxceleb, Mar. 19, 2023.

(Continued)

*Primary Examiner* — Brian Werner
(74) *Attorney, Agent, or Firm* — PEARL COHEN ZEDEK LATZER BARATZ LLP

(57) ABSTRACT

System and method for voice-face matching, including: obtaining a voice sample, a first facial image of a first person, and a second facial image of a second person; calculating a distance between the first facial image and the second facial image; using a voice-face matching model, calculating a latent space vector for each of the voice sample and the first and second facial images; and training the voice-face matching model using a loss function that decreases a distance between the latent space vector of the voice sample of the first person and the latent space vector of the first facial image, and increases a distance between the latent space vector of the voice sample of the first person and the latent space vector of the second facial image, wherein the loss function is adjusted based on the distance between the first facial image and the second facial image.

16 Claims, 8 Drawing Sheets

(56) References Cited

PUBLICATIONS

Schroff et al; FacNet a Unified embedding for face recognition and clustering, arXiv:1503.03832v3; 4, Jun. 17, 2015.
Speaker Verification with ECAPA-TDNN embeddings on Voxceleb Mar. 19, 2023.
Bai et al; Speaker Recognition Based on Deep Learning: An Overview, Apr. 4, 2021.
Chung et al; Lip Reading Datasets.
Chung et al;TheVoxCeleb2 Dataset; VoxCeleb2: Deep Speaker Recognition. Interspeech 2018.
Nagrani et al; Seeing Voices and Hearing Faces: Cross-model biometric matching, https://doi.org/10.48550/arXiv.1804.00326, Apr. 3, 2018.
Ngrani et al; Learnable PINs: Cross-Modal Embeddings for Personal Identity, https://doi.org/10.48550/arXiv.1805.00833, Jul. 26, 2018.
Xiong et al: Voice-Face Cross-modal Matching and Retrieval: A Benchmark, ;https://doi.org/10.48550/arXiv.1911.093338, Dec. 30, 2019.
Hoffer et al; Deep Metric Learning Using Triplet Network, Department of Electrical Engineering, Technion Israel Institute of Technology, Dec. 2018.
Wang et al; Additive Margin Softmax for Face verification, IEEE Signal Processing Letters, vol. 25 Issue: 7 pp. 926-930, May 30, 2018.

\* cited by examiner

Examples of different people with similar facial features

SYSTEM AND METHOD FOR MATCHING A VOICE SAMPLE TO A FACIAL IMAGE

FIELD OF THE INVENTION

The present invention relates generally to matching a voice sample to a facial image; by way of non-limiting example, a machine learning model may be trained to match a voice sample to a facial image.

BACKGROUND

Voice face matching problems may be defined by the following task: provided with a sample of a person's voice and a plurality of images of a plurality of persons, determine which face belongs to the speaker.

It has been shown experimentally that human appearances are associated with their voices. For example, properties like age, gender, ethnicity, and accent may influence both the facial appearance and voice. In addition, there exist other, more subtle properties that influence both the facial appearance and voice, such as the level of specific hormones.

SUMMARY

According to embodiments of the invention, a computer-based system and method for matching a voice sample to a facial image may include: obtaining a plurality of triplets, each comprising at least a voice sample of a first person, a facial image of the first person and a facial image of a second person; calculating a distance between the facial image of the first person and the facial image of the second person; using a voice-face matching model, calculating a latent space vector for the voice sample of the first person, a latent space vector for the facial image of the first person and a latent space vector for the facial image of the second person; and training the voice-face matching model using a weighted triplet loss function that decreases a distance between the latent space vector of the voice sample of the first person and the latent space vector of the facial image of the first person, and increases a distance between the latent space vector of the voice sample of the first person and the latent space vector of the facial image of the second person, wherein the weighted triplet loss function may be adjusted based on the distance between the facial image of the first person and the facial image of the second person.

According to embodiments of the invention, the weighted triplet loss function may be adjusted so that a level of increasing the distance between the latent space vector of the voice sample of the first person and the latent space vector of the facial image of the second person is related to the distance between the facial image of the first person and the facial image of the second person.

According to embodiments of the invention, the weighted triplet loss function may be adjusted to be inversely related to the level of similarity between the facial image of the first person and the facial image of the second person.

According to embodiments of the invention, the distance may be an inverse of a cosine similarity measure and the triplet loss function may include a non-decreasing function of an inverse of the cosine similarity measure.

According to embodiments of the invention, the latent space vector of the voice sample of the first person may be calculated by a pretrained speaker recognition model, followed by a voice feed forward neural network, and the latent space vector of the facial image of the first person and the latent space vector of the facial image of the second person may be calculated by a pretrained face recognition model, followed by an image feed forward neural network.

According to embodiments of the invention, the triplet loss function may be:

$$\text{loss} = \Sigma_k \max(\|emb_{voice}(v_i^k) - emb_{face}(f_i^k)\|^2 - \|emb_{voice}(v_i^k) - emb_{face}(f_j^k)\|^2 + \alpha, 0) \cdot f(d(emb_{face}^{pre}(f_i^k), emb_{face}^{pre}(f_j^k))))$$

Where:
- $(v_i^k, f_i^k, f_j^k)$ is a triplet set used for the training,
- $v_i^k$ is the voice sample of the first person,
- $f_i^k$ is the facial image of the first person,
- $f_j^k$ is the facial image of the second person,
- $\alpha \in R$, is a margin constant,
- $emb_{voice}(v_i^k)$ is the latent space vector of the voice sample,
- $emb_{face}(f_i^k)$ is the latent space vector of the facial image of the first person,
- $emb_{face}(f_j^k)$ is the latent space vector of the facial image of the second person,
- $emb_{face}^{pre}(f_i^k)$ is a latent space vector of the facial image of the first person generated by a pretrained model,
- $emb_{face}^{pre}(f_j^k)$ is a latent space vector of the facial image of the second person generated by a pretrained model, and
- $d(emb_{face}^{pre}(f_i^k), emb_{face}^{pre}(f_j^k))$ is a distance between the image latent space vector generated by the pretrained model for the facial image of the first person $emb_{face}^{pre}(f_i^k)$ and the facial image of the second person $emb_{face}^{pre}(f_j^k)$.

Embodiments of the invention may include: obtaining a pair of a new voice sample and a new facial image to the trained voice-face matching model; and determining, using the trained voice-face matching model, whether the new voice sample and the new facial image belong to the same person or not.

According to embodiments of the invention, a computer-based system and method for matching a voice sample to a facial image may include: calculating a distance between pairs of facial images in a database relating each of a plurality of facial images of one person, to a voice sample of the same person; calculating, by a voice subnetwork, a latent space vector for each of the voice samples in the database; calculating, by a face subnetwork, a latent space vector for each of the facial images in the database; and jointly training, using a weighted triplet loss function, the face subnetwork and the voice subnetwork, by for a plurality of triplets, each including a latent space vector of a voice sample of a first person, a latent space vector of a facial image of the first person and a latent space vector of a facial image of a second person, adjusting the weighted triplet loss function to decrease a distance between the latent space vector of the voice sample of the first person and the latent space vector of the facial image of the first person, and increase a distance between the latent space vector of the voice sample of the first person and the latent space vector of the facial image of the second person, wherein training may include adjusting the weighted triplet loss function based on the distance between the facial image of the first person and the facial image of the second person.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
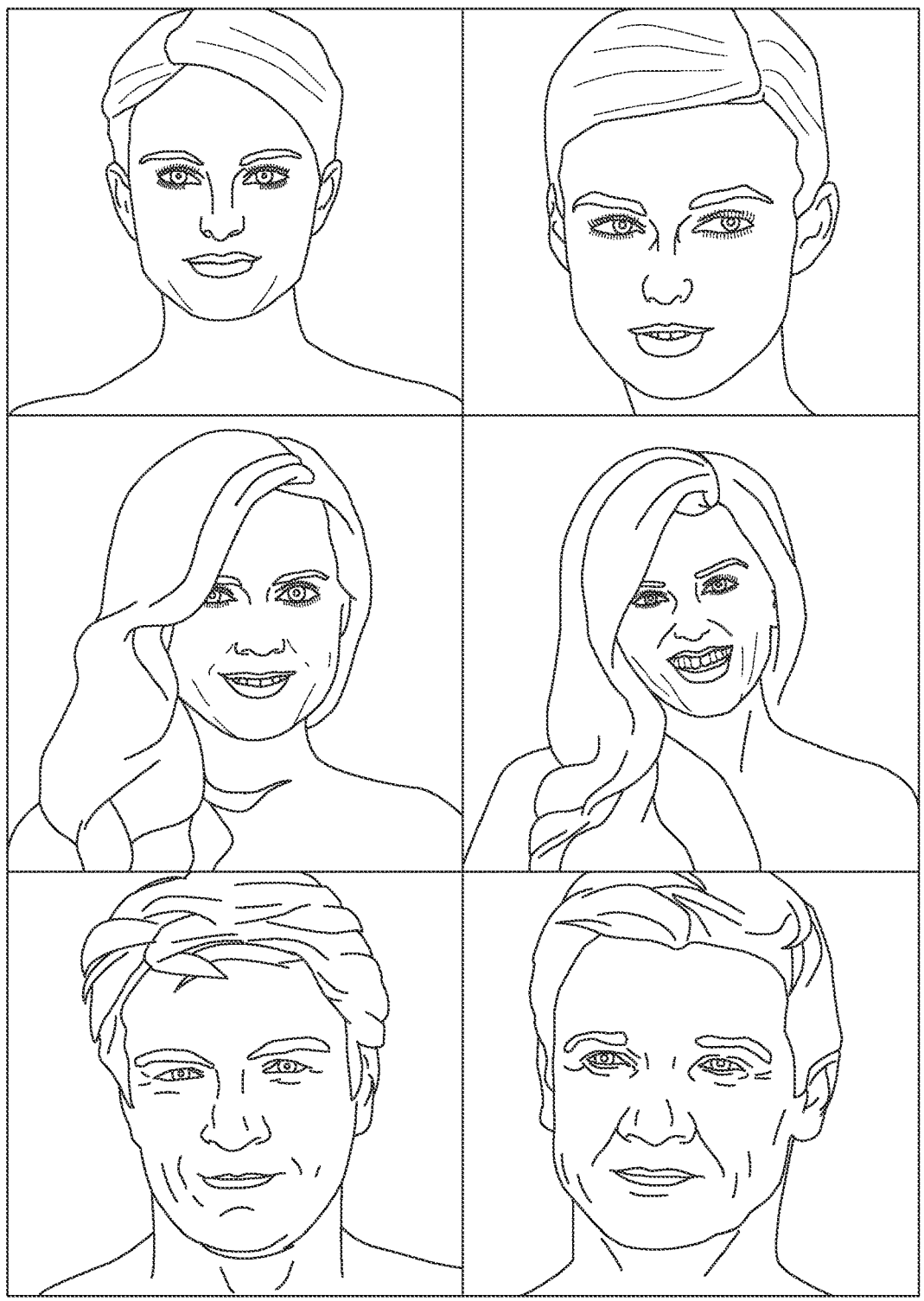
FIG. 1 depicts images of different people, helpful in explaining embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may provide a system and method for matching a voice sample to a facial image. Embodiments of the invention may train a machine learning (ML) model, referred to herein as a voice-face matching model, so that a distance between the latent vectors generated by the voice-face matching model may be lower if the voice sample and image belong to the same person, compared to latent vectors generated for voice and image belong to different persons.

Some practical applications examples of voice face matching may include criminal investigations where a sample of the voice is the only evidence: for example, the voice sample together with an image of a suspect may be provided to the system that may provide determination (and/or a confidence level) whether the voice and face belong to the same person or not. Another application may include deepfake speech synthesis detection, in which a fake audio is combined with a video of a person. In this case the audio may be provided together with an image of the talking person taken form the video, and the system may be provided to the system that may provide determination (and/or confidence level) whether the voice and face belong to the same person or not.

Embodiments of the invention may further provide a probability that a speech sample and a image face match. For example, the distance metric may be associated with or transformed to a probability level. This may be performed, for example by validating the trained model using a database on voice-face samples. Thus, embodiments of the invention may be used for:

Face database sorting—given a speech sample and a database of face photos, embodiments of the invention may be used to sort the database in order of probability that the person on the photo is the speech sample owner.

Voice database sorting—given a photo of a person and a database of speech samples, embodiments of the invention may be used to sort the database in order of probability that the speech belongs to the person on the photo.

Comparing probabilities—quantitatively compare relative probabilities that a speech sample belongs to a first person rather than a second person.

According to embodiments of the invention, the voice-face matching model may include one or more neural networks (NN). NNs are computing systems inspired by biological computing systems, but operating using manufactured digital computing technology. NNs are mathematical models of systems made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning or training proceeds typically using a loss function. The weight increases or decreases the strength of the signal at a connection. Typically, NN neurons or nodes are divided or arranged into layers, where different layers can perform different kinds of transformations on their inputs and can have different patterns of connections with other layers.

NN systems can learn to perform tasks by considering example input data, generally without being programmed with any task-specific rules, being presented with the correct output for the data, and self-correcting, or learning using a loss function.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example time delay neural network (TDNN) which is a multilayer artificial neural network that can be trained with shift-invariance in the coordinate space.

In practice, an NN, or NN learning, may be performed by one or more computing nodes or cores, such as generic central processing units or processors (CPUs, e.g. as embodied in personal computers) or graphics processing units (GPUs), which can be connected by a data network.

For training the voice-face matching model, embodiments of the invention may use a plurality of data structures such as triplets, where each data structure or triplet includes at least a voice or speech sample of a first person, a facial image of the first person and a facial image of a second, different, person. The facial images may be provided in any applicable computerized image format such as joint photographic experts group (JPEG or JPG), portable network graphics (PNG), graphics interchange format (GIF), tagged image file (TIFF), etc., and the voice or speech sample may be provided in any applicable computerized audio format such as MP3, MP4, M4A, WAV, etc.

The voice sample and each of the images may be provided to the voice-face matching model that may generate a latent space vector, also referred to herein as a representation, a feature vector, in a feed forward process, for each of the voice and images. As used herein, a latent space vector, also referred to as a signature or a feature vector, may include a reduced dimension (e.g., compressed) representation of the original data, generated for example by an ML model or an encoder. The latent space vector may include a vector (e.g., an ordered list of values) that represent the original data in a compressed form that, if generated properly, includes important or significant components or characteristics of the raw data.

Embodiments of the invention may use a loss function, also referred to herein as a weighted triplet loss function, to train the voice-face matching model. The loss function may be used in the training process to adjust weights and other parameters in the voice-face matching model in a back propagation process to decrease the distance between the latent vectors generated by the voice-face matching model for the voice sample and image of the first person, and increase the distance between the latent vectors generated by the voice-face matching model for the voice sample of the first person and the image of the second person. Embodiments of the invention may further calculate a distance (which may be an inverse of the level of similarity) between the facial image of the first person and the facial image of the second person, and may adjust the loss function based on the distance between the facial image of the first person and the facial image of the second person.

According to embodiments of the invention, the voice-face matching model may include two subnetworks, a voice encoder (also referred to as a voice subnetwork) and a face encoder (also referred to as a face subnetwork), so that after training, a distance between the latent vectors generated by the two encoders is lower if the voice sample and image belong to the same person, comparing with latent vectors generated for voice and image belong to different persons.

For training the two encoders, the voice sample may be provided to the voice encoder that may generate the voice latent space vector, and each of the images may be provided to the face encoder that may generate the latent space vectors for the images. Embodiments of the invention may use the weighted triplet loss function to train the encoders. The loss function may be used in the training process to adjust weights and other parameters in the voice encoder and the face encoder (in a back propagation process) to decrease the distance between the latent vectors generated by the two encoders for the voice sample and image of the first person, and increase the distance between the latent vectors generated by the two encoders for the voice sample of the first person and the image of the second person. As noted, embodiments of the invention may further calculate a distance (which may be an inverse of the level of similarity) between the facial image of the first person and the facial image of the second person, and may adjust the loss function based on the distance between the facial image of the first person and the facial image of the second person.

As a result of the training, the voice-face matching model can encode information about face samples and speech or voice samples in the latent space so that distance between vectors corresponding to images and voices of the same person are smaller than distances between vectors corresponding to images and voices of different persons, thus allowing to distinguish between pairs of voice and image of the same person and pairs of voice and image of different persons, e.g., by comparing the distance to a threshold, by training a NN for that purpose, or by any other applicable classification method.

Training machine learning models for voice face matching task usually requires a large amount of speech samples and matching face images (voice and images of the same person). Datasets that include such voice-image pairs may be used. A popular dataset for this task is the VoxCeleb2 dataset, a dataset of over 1 million utterances for about 6,000 celebrities, extracted from videos uploaded to YouTube. The dataset may include pairs of audio recordings of the voice of a person matched with an image of the person. For example, the voice sample and the image may be extracted from a single video using known in the art techniques. The data structures such as triplets used for training the voice-face matching model may be composed by taking a voice sample and an image of the same person, and another image of a second, different person in the dataset. Typically, generating such a dataset requires some human supervision and relies on a list of verified celebrities with reference images. Applying the same strategy on larger data without human supervision leads to a noisy dataset with some level of identity mismatches. However, identity mismatches can destabilize the training procedure and potentially harm generalization of the model.

Prior art procedures for training voice-face matching models may use a loss function that works to increase the distance between latent space vectors corresponding to speech of a first person and an image of a second person, regardless of the level of similarity between an image of the first person and the image of the second person, e.g., disregarding the level of visual resemblance between the first person and the second person. Thus, the loss function of prior art procedures may increase the distance between latent space vectors corresponding to speech of a first person and image of a second person even if the first person and the second person look very similar. FIG. 1 presents images of different people; however, it is clearly apparent that each row presents different people with similar appearances. This may make it difficult for voice-face matching model to generalize and find correlations between vocal and facial features of a person. Embodiments of the invention may improve on prior art techniques, by resolving this issue by considering the level of physical (e.g. image) resemblance of the first person and the second person in each triplet, and adjusting the loss function accordingly, so that a level of increase in the distance between the latent space vector of the voice sample of the first person and the latent space vector of the facial image of the second person is inversely related to the level of similarity between the facial image of the first person and the facial image of the second person (or directly related to the distance between the facial image of the first person and the facial image of the second person). In this way, triplets that include similar faces may have less influence on the weights of the voice-face matching model, and triplets that include less similar faces may have more influence on the weights of the voice-face matching model. Embodiments of the invention may not only improve training in cases of training using noisy dataset (e.g., a dataset that is not verified by a human observer), but may also stabilize the training process for a clean dataset (e.g., a dataset that is verified by a human observer), that include people with very similar faces.

Embodiments of the invention provide a modified loss functions for voice face matching training that may potentially improve the generalization quality of the model and the robustness of model training process on noisy data. According to embodiments of the invention, a weighted triplet loss may be designed to give less weight to triplets with similar looking faces thus relaxing excessively strict constrictions of the triplets used for this task. To determine a distance or similarity between faces, a separate pretrained face recognition network may be used.

Accordingly, embodiments of the invention may improve the robustness and efficiency of the training process, thus resulting in more accurate results of the trained model. Thus, embodiments of the invention may improve the technology of voice-face matching by providing voice-face matching model with superior performances in terms of quicker training and more accurate results compared with prior art voice-face matching models.

Figure 2:
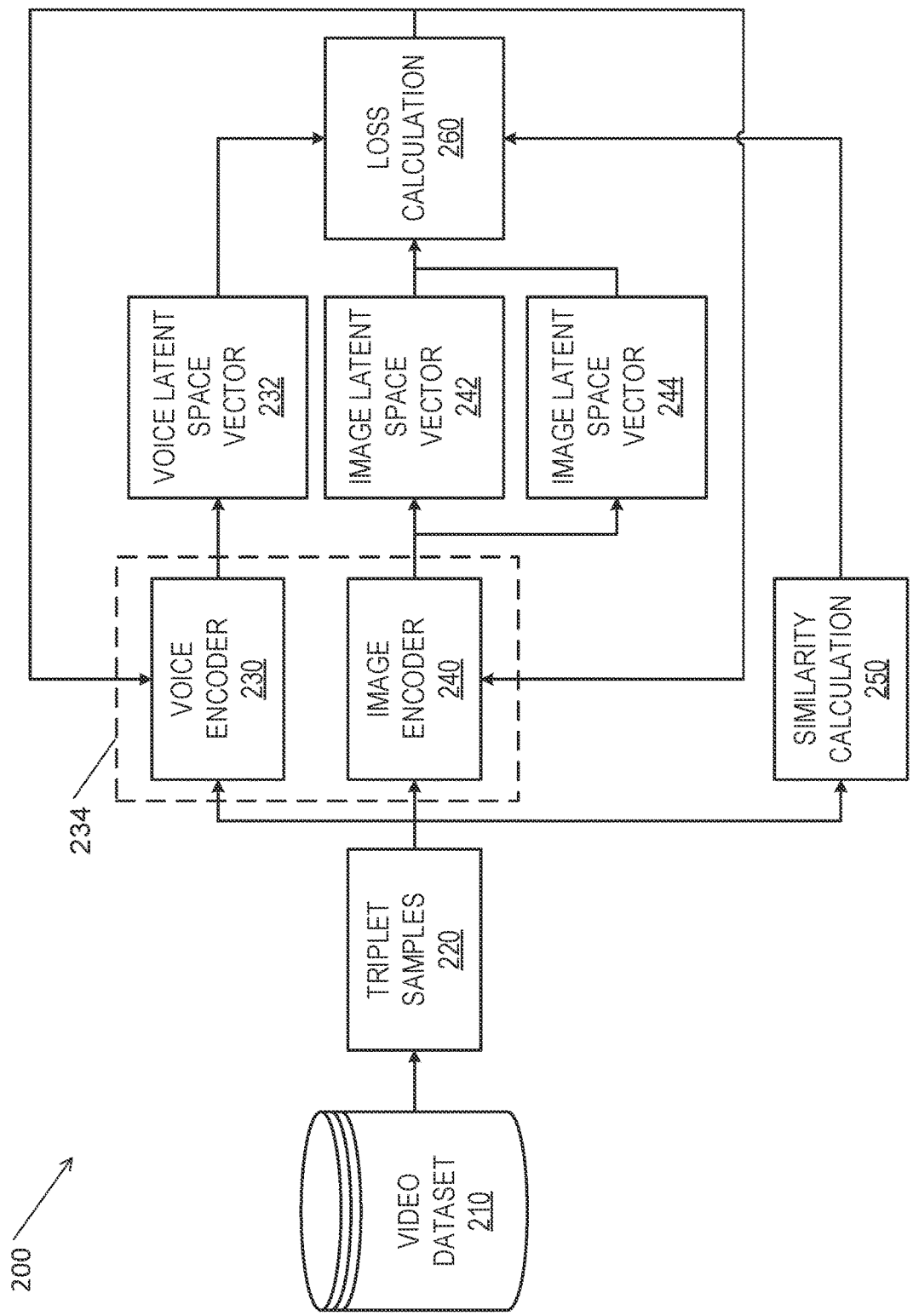
FIG. 2 depicts a system for training voice-face matching model, according to embodiment of the invention.
Figure 10:
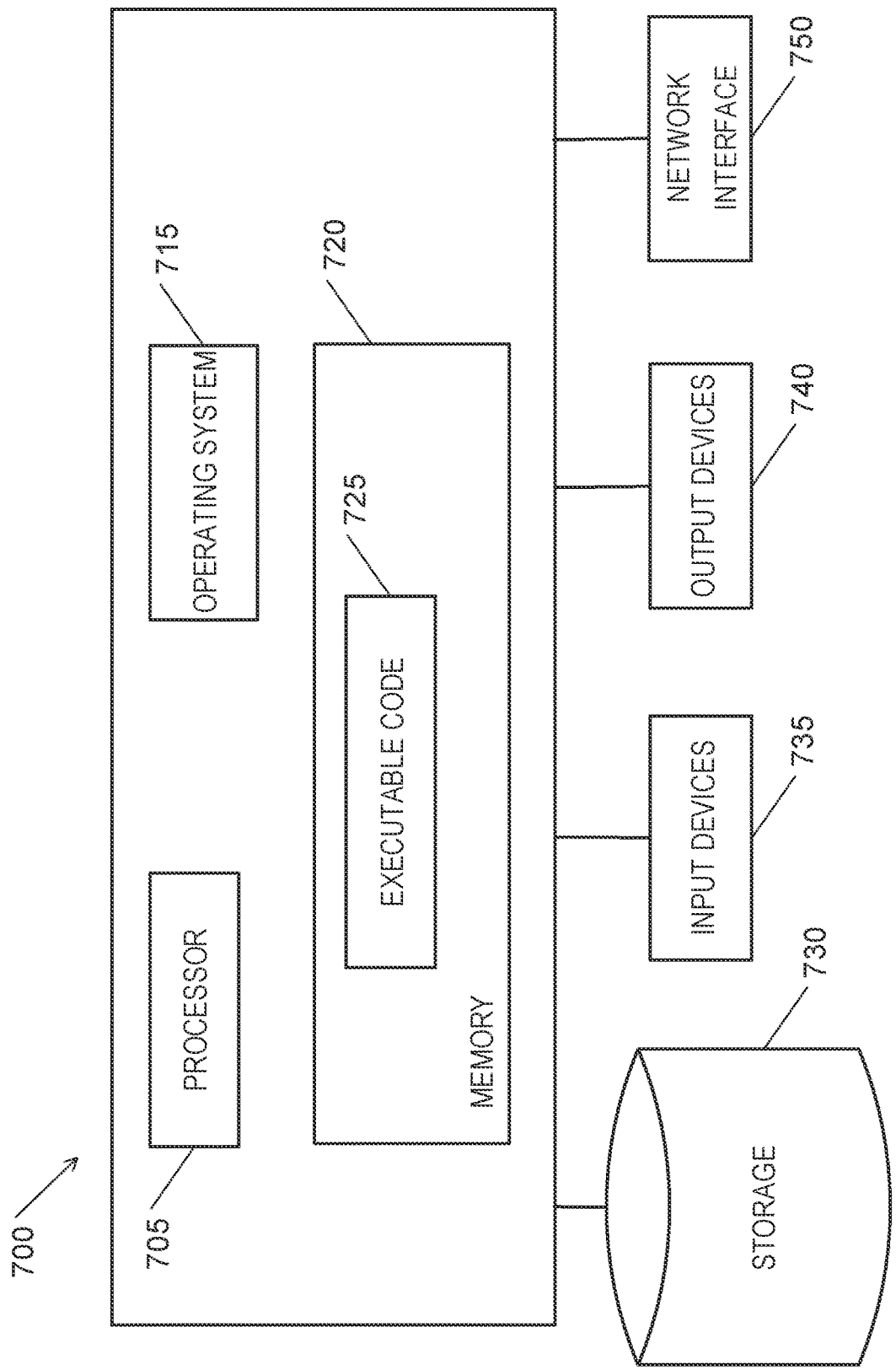
FIG. 10 shows a high-level block diagram of an exemplary computing device which may be used with embodiments of the present invention.

Reference is made to FIG. 2, which depicts a system 200 for training voice-face matching model 234, according to embodiment of the invention. It should be understood in advance that the components, and functions shown in FIG. 2 are intended to be illustrative only and embodiments of the invention are not limited thereto. While in some embodiments the system of FIG. 2 is implemented using systems as shown in FIG. 10, in other embodiments other systems and equipment can be used.

Audio-video dataset 210 may include pairs of matching voice or speech samples and face images, e.g., voice samples and images of the same person. Audio-video dataset 210 may be stored, for example, on storage 730 presented in FIG. 10. In block 220 triplets may be composed by taking a voice sample and an image of the same person, and another image of a second, different person in audio-video dataset 210. It should be readily understood that while embodiments of the invention are described with reference to triplets, this this not limiting and other data structures, and datasets of voices and matching and unmatching images, may be used, with proper adjustments.

According to some embodiments of the invention, voice-face matching model 234 includes two subsystems also referred to herein as subnetworks or encoders, a voice encoder 230 and an image encoder 240. Each of voice encoder 230 and image encoder 240 may include an ML model, such as an NN that may generate a latent space vector for the input data. For example, voice encoder 230 may generate voice latent space vector 232, also referred to herein as a speech signature, and image encoder 240 may generate image latent space vectors 242 and 244, also referred to herein as face signature vectors, where image latent space vector 242 is generated for the first image in the triplet (e.g., the image of the speaker) and image latent space vector 244 is generated for the second image in the triplet (e.g., the image of the other person).

Similarity calculation module 250 may calculate a distance, which is an inverse of the level of similarity, between the facial image of the first person (the speaker) and the facial image of the second person. According to some embodiments, the distance between the facial image of the first person (the speaker) and the facial image of the second person may calculated as the distance between embeddings generated for the first and second images by a pretrained ML model such as a pretrained face recognition model, or other suitable trained facial images processing model. For example, the Euclidian distance between the embeddings associated with the entities for which a distance is being calculated, the embeddings generated by the pretrained model, may be calculated, or the cosine similarity between the embeddings generated by the pretrained model may be calculated (and an inverse of the cosine similarity may be taken as a measure of the distance), etc. Other distance metrics metrices may be used. Embeddings may be, for example, vectors (e.g. ordered sets) of numbers which may represent features or other characteristics of the entity for which the embedding is produced.

According to embodiments of the invention, loss calculation module 260 may calculate a loss function, also referred to herein as the weighted triplet loss function, based on the voice latent space vector 232, the image latent space vectors 242 and 244, the labels indicating which is the image latent space vector 242 of the speaker and which is the image latent space vector 244 of the other, different, person, and based on the distance between the facial image of the first person (the speaker) and the facial image of the second person.

For example, the following loss function may be used (other functions may be used):

$$loss = \Sigma_k \max(\|emb_{voice}(v_i^k) - emb_{face}(f_i^k)\|^2 - \|emb_{voice}(v_i^k) - emb_{face}(f_j^k)\|^2 + \alpha, 0) \cdot f(d(emb_{face}^{pre}(f_i^k), emb_{face}^{pre}(f_j^k)))$$

Where:

$(v_i^k, f_i^k, f_j^k)$ is a triplet set used for training, where $v_i^k$ is the voice sample of the first person (e.g., a vector of real or imaginary values representing digital samples of sound), $f_i^k$ is the facial image (e.g., a matrix of values representing pixels of the image) of the first person, and $f_j^k$ is the facial image of the second, different, person. $\alpha \in \mathbb{R}$, is a triplet loss margin constant (e.g., a positive number), $emb_{voice}$(voice) is the voice latent space vector 232 generated by encoder network 230, $emb_{face}$(face) is the image latent space vector 232 or 244 generated by image encoder network 240, $emb_{face}^{pre}$(face) is an image latent space vector generated by a pretrained model such as a pretrained face recognition model, or other suitable trained facial images processing model, $d(emb_{face}^{pre}(f_i^k), emb_{face}^{pre}(f_j^k))$ is a distance between the image latent space vectors generated by the pretrained model for the facial image of the first person $emb_{face}^{pre}(f_i^k)$ and the facial image of the second person $emb_{face}^{pre}(f_j^k)$. For example, the distance may equal the Euclidian distance between $emb_{face}^{pre}(f_i^k)$ and $emb_{face}^{pre}(f_j^k)$, or the inverse of the cosine similarity measure, e.g., $d(emb_{face}^{pre}(f_i^k), emb_{face}^{pre}(f_j^k)) = 1 - \text{cosine}_{similarity}(emb_{face}^{pre}(f_i^k), emb_{face}^{pre}(f_j^k))$. Other distance metrics may be used. $f(x)$ is a non-decreasing function, e.g., a sigmoid.

For discussion purposes, an exemplary loss function of prior art systems may be:

$$loss = \sum_k \max\left(\|emb_{voice}(v_i^k) - emb_{face}(f_i^k)\|^2 - \|emb_{voice}(v_i^k) - emb_{face}(f_j^k)\|^2 + \alpha, 0\right) \quad \text{(Equation 2)}$$

As opposed to the prior art loss function of Equation 2, an example loss function according to embodiments of the invention, e.g., Equation 1, is multiplied by the distance between the faces of the first person and the second person in the triplet. Thus, the loss value increases as the distance increases, e.g., as the difference between the faces increases, and decreases as the distance decreases, e.g., as the similarity between the two faces increases. Thus, the effect of triplets that include similar faces on the training process, e.g., on the values of the weights of voice encoder 230 and image encoder 240, is lower than the effect of triplets that include less similar faces. Thus, the loss function of Equation 1 may give less weight to triplets with similar looking faces than to less similar faces. According to embodiments of the invention, if a triplet includes similar faces, and the loss function does not consider this similarity, as in the prior art loss function of Equation 2, the system may train voice encoder 230 and image encoder 240 to increase the distance between a voice sample and an image of a face that is similar to the face of the person whose voice sample is used in the triplet. This may erroneously adjust the weights of voice encoder 230 and image encoder 240 and adversely affect the training. In contrary to that, the loss function of Equation 1 increases as the similarity between the two faces in the triplet decreases, thus giving more weight in the training process to triples that include less similar faces comparing with triplets that include more similar faces.

According to embodiments of the invention, it may be assumed that, as a result of the training, the cosine similarity (or other metric used for measuring similarity) between voice latent space vector 232 and image latent space vector 242 from images of the same person or images of similar persons is greater than cosine similarity between voice latent space vector 232 and image latent space vectors 242 from images of different, less similar appearing, people.

Figure 3:
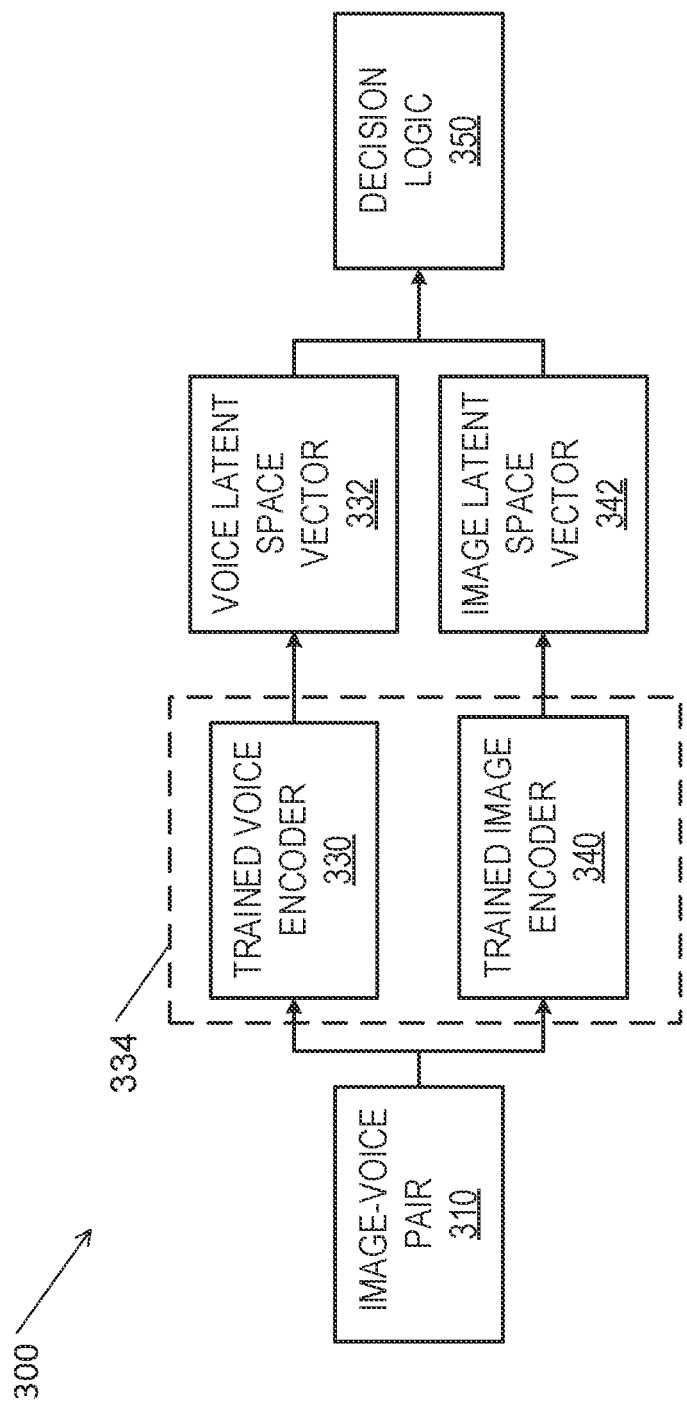
FIG. 3 depicts a system for voice-face matching using a trained voice-face matching model, according to embodiment of the invention.

Reference is made to FIG. 3, which depicts a system 300 for voice-face matching using a trained voice-face matching model 334, according to embodiment of the invention. It should be understood in advance that the components, and functions shown in FIG. 3 are intended to be illustrative only and embodiments of the invention are not limited thereto. While in some embodiments the system of FIG. 3 is implemented using systems as shown in FIG. 10, in other embodiments other systems and equipment can be used.

Trained voice-face matching model 334 may obtain an image-voice pair 310, including a voice sample of a person and an image of a person (an image of a face of a person). Trained voice-face matching model 334 may include voice-face matching model 234 after training according to any of the training methods disclosed herein, e.g., as described with relation to FIGS. 2, 4 and 5. For example, the voice sample may be provided to trained voice encoder 330, which may be voice encoder 230 after training, and the image may be provided to trained image encoder 340, which may be image encoder 230 after training. Trained voice encoder 330 may generate or infer voice latent space vector 332 and trained image encoder 340 may generate or infer image latent space vector 342.

Finally, decision logic 350 may obtain voice latent space vector 332 and image latent space vector 342 and may determine whether image-voice pair 310 belong to the same person or not and/or may calculate a probability level that the image-voice pair 310 belong to the same person. According to some embodiments, decision logic 350 may determine whether image-voice pair 310 belong to the same person or not by calculating a distance, e.g., Euclidian distance, or a measure of similarity. e.g., cosine similarity, and verify the distance or the measure of similarity against a threshold, e.g., it may be determined that image-voice pair 310 belong to the same person if the distance is below a threshold or if the measure of similarity is above a threshold, and that the image-voice pair 310 do not belong to the same person otherwise. Alternatively, decision logic 350 may determine whether image-voice pair 310 belong to the same person or not using another ML model, e.g., another NN, that is trained together with voice-face matching model 334, for example, as demonstrated in FIG. 4. Decision logic 350 may further provide a confidence level for the determination and/or a matching score, e.g., a grade indicative of the level of compatibility between the face and the voice sample, e.g., the level of similarity between voice latent space vector 332 and image latent space vector 342. Decision logic 350 may calculate a probability level that the image-voice pair 310 belong to the same person based on the voice latent space vector 332 and image latent space vector 342 or based on the distance or similarity measure between the voice latent space vector 332 and image latent space vector 342. The probability may be calculated using any applicable method, using a function or a look-up-table relating a distance or similarity measure to a probability level. The function or a look-up-table may be generated experimentally by providing a plurality of matching an unmatching (e.g., labelled) image-voice pairs 310, calculating the distance or similarity measure, comparing to the known label and generating a database of distance or similarity measure and an associated label.

Figure 4:
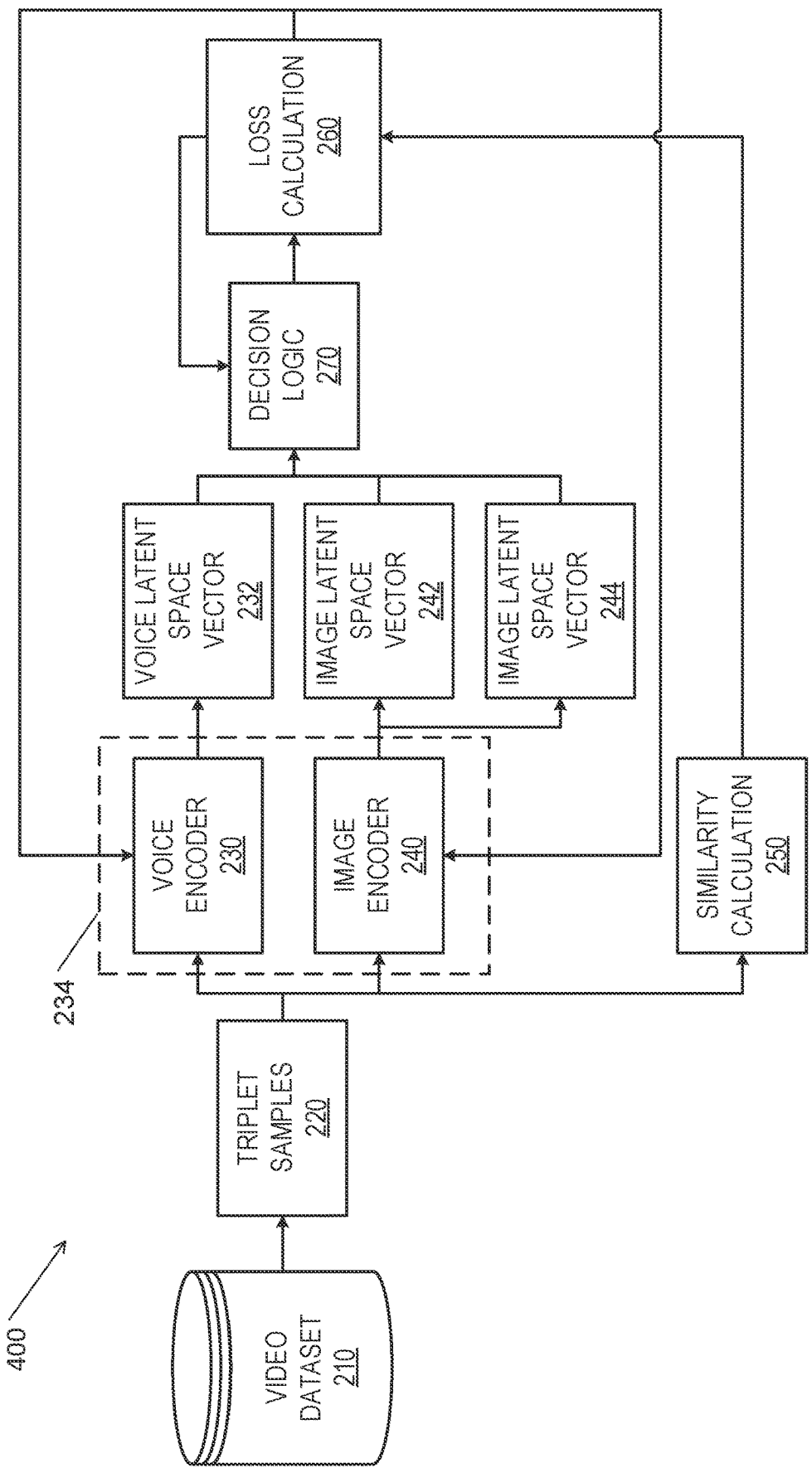
FIG. 4 depicts a system for training voice-face matching model, according to embodiment of the invention.

FIG. 4 depicts a system 400 for training voice-face matching model 234, according to embodiment of the invention. It should be understood in advance that the components, and functions shown in FIG. 4 are intended to be illustrative only and embodiments of the invention are not limited thereto. While in some embodiments the system of FIG. 4 is implemented using systems as shown in FIG. 10, in other embodiments other systems and equipment can be used. System 400 may be similar to system 200 presented in FIG. 2, and similar components will not be described again. System 400 may include a trainable decision logic 270, that may include am ML model such as a NN of any applicable type. Decision logic 270 may be trained using the loss function calculated by module 260, e.g., using Equation 1, jointly with voice-face matching model 234. After training is complete, the trained decision logic 270 may operate as decision logic block 350 in system 300.

Figure 5:
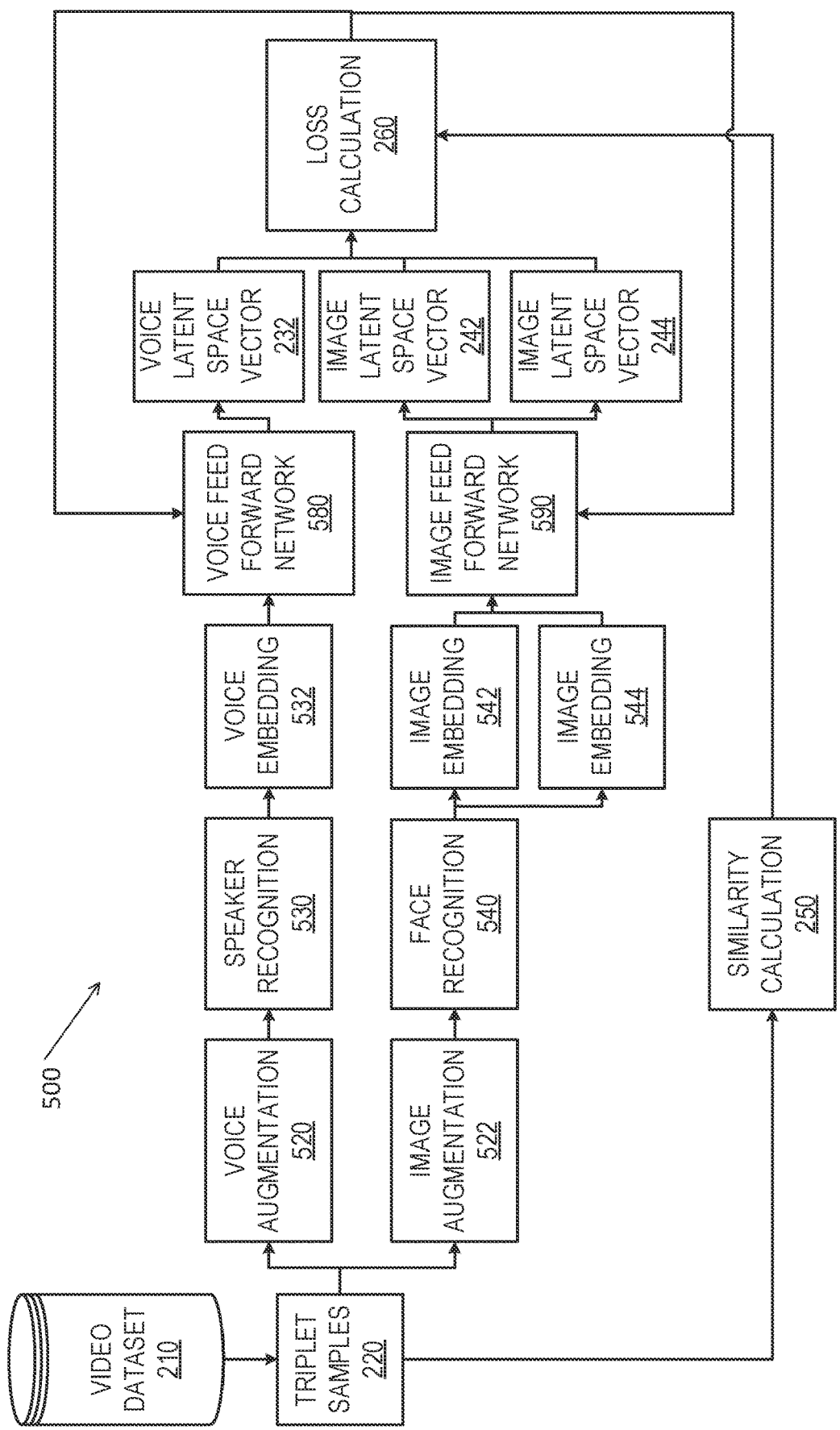
FIG. 5 depicts a system for training voice-face matching model, according to embodiment of the invention.

Reference is made to FIG. 5, which depicts a system 500 for training voice-face matching model, according to embodiment of the invention. It should be understood in advance that the components, and functions shown in FIG. 5 are intended to be illustrative only and embodiments of the invention are not limited thereto. While in some embodiments the system of FIG. 5 is implemented using systems as shown in FIG. 10, in other embodiments other systems and equipment can be used.

System 500 may be similar to system 200 presented in FIG. 2, and similar components will not be described again. System 500 may include voice augmentation block 520 and image augmentation block 522. It should be readily understood to those skilled in the art that voice augmentation block 520 and image augmentation block 522 are optional and may be omitted if the training dataset is large enough. Data augmentation may include a variety of techniques for artificially increasing a training dataset by creating modified copies of samples in the original dataset using perturbations. The perturbations may include minor changes to samples in the dataset or using deep learning models to generate new data points based on existing ones. Data augmentations are known in the art and are typically used for training deep neural networks. Voice augmentation block 520 may use any audio augmentations technique that is suitable for speaker recognition tasks. Image augmentation block 522 may use any augmentations used for training face recognition networks.

According to the embodiment presented in FIG. 5, voice encoder 230 may include a pretrained speaker recognition model 530 followed by voice feed forward network 580. Pretrained speaker recognition model 530 may include neural networks and/or other models that are pretrained for speaker recognition, such as TDNN models or CNN models. One example for a model used for speaker recognition model 530 may include the ECAPA-TDNN model provided by the SpeechBrain open-source conversational AI toolkit, which includes a combination of convolutional and residual blocks and uses attentive statistical pooling to generate an embedding. Another example may include a TDNN model coupled with statistical pooling provided by the SpeechBrain open-source conversational AI toolkit, that generates xvector embeddings. Other types of ML models may be used. Pretrained speaker recognition model 530 may obtain voice or speech samples from triplet samples 200 and/or from voice augmentation block 520, and generate a voice embedding 532 for each sample.

Voice domain feed forward network 580 may include a feed forward NN of any applicable type. For example, voice domain feed forward network 580 may include multilayer feed-forward NN with multiple hidden layers and non-linear activation functions. Other networks may be used. Voice domain feed forward network 580 may be trained using the weighted triplet loss function calculated by loss calculation module 260 to generate voice latent space vector 232. Voice domain feed forward network 580 may obtain voice embeddings 532 and generate a voice latent space vector 232 for each input voice embedding 532.

According to the embodiment presented in FIG. 5, image encoder 240 may include a pretrained face recognition model 522, followed by an image feed forward neural network 590. Pretrained face recognition model 522 may include an NN similar to those used for face recognition applications, such as. FaceNet, which is a model that directly learns a mapping from face images to a compact Euclidean space where distances directly correspond to a measure of face similarity.

Image domain feed forward network 590 may include a feed forward neural network of any applicable type. For example, image feed forward network 590 may include multilayer feed-forward NN with multiple hidden layers and non-linear activation functions. Other networks may be used. Image domain feed forward network 590 may be trained using the weighted triplet loss function calculated by loss calculation module 260 to generate image latent space vectors 242 and 244. Image domain feed forward network 590 may obtain image embeddings 542 and 544 and generate an image latent space vectors 242 and 244 for each input image embeddings 542 and 544, respectively. Voice domain adaptation network 580 and image domain adaptation network 590 may provide the same dimensionality for outputs of voice domain adaptation network 580 and image domain adaptation network 590.

Figure 6:
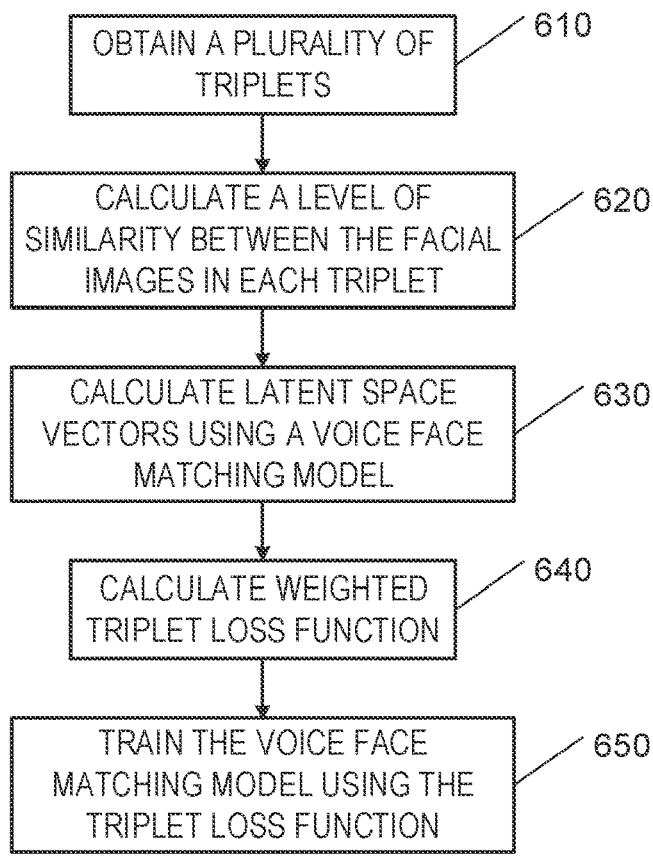
FIG. 6 is a flowchart of a method for training a voice-face matching model, according to embodiments of the invention.

Reference is now made to FIG. 6, which is a flowchart of a method for training a voice-face matching model, according to embodiments of the invention. While in some embodiments the operations of FIG. 6 are carried out using systems as shown in FIGS. 2, 4, 5 and 9, in other embodiments other systems and equipment can be used.

In operation 610, a plurality of triplets may be obtained or generated. e.g., by a processor (e.g., processor 705 depicted in FIG. 10). In some embodiments, each triplet may include at least a voice sample of a first person, a facial image of the first person and a facial image of a second person. The triplets may be obtained or generated, for example, by taking a pair of matching voice sample and image, e.g., an image and a voice sample may be extracted from the same video that depicts the person and provides some utterances or a speech sample of the person in the audio part of the video, and adding to the pair an image of a different person. In some cases, preparing the training dataset, e.g., the triplets, may require some human intervention and supervision, to make sure that the second image in the set is indeed of a different person. In some embodiments this may be verified automatically using face recognition applications. In some embodiments, the training dataset may be enlarged by generating new triplets from existing triples using augmentation techniques, by creating modified copies of samples in the original set. e.g., by performing minor changes or perturbations to one or ore of the voice sample of the first person, the facial image of the first person and the facial image of a second person.

In operation 620, the processor may calculate a distance between the facial image of the first person and the facial image of the second person. For example, the processor may use a pretrained face recognition network to generate or calculate a feature vector or a low-dimension representation of each of the facial images and calculate a level of similarity, e.g., cosine similarity, or distance, e.g., Euclidian distance, between the facial images. If a level of similarity metric is calculated, the inverse of the level of similarity may be the distance.

In operation 630, the processor may, using the voice-face matching model as it being trained, calculate a latent space vector for the voice sample of the first person, a latent space vector for the facial image of the first person and a latent space vector for the facial image of the second person. In some embodiments, the voice-face matching model includes a voice encoder such as voice encoder 230, for calculating the latent space vector for the voice sample of the first person, and an image encoder such as image encoder 240 for calculating the latent space vector for the facial image of the first person and the latent space vector for the facial image of the second person. In some embodiments, the voice encoder may include a pretrained speaker recognition model, such as speaker recognition model 530 followed by a voice feed forward neural network such as voice feed forward network 580, and the image encoder may include a pretrained face recognition model, such as face recognition model 540 followed by an image feed forward neural network such as image feed forward network 590.

In operation 640, the processor may calculate a weighted triplet loss function that may decrease a distance between the latent space vector of the voice sample of the first person and the latent space vector of the facial image of the first person, and increase a distance between the latent space vector of the voice sample of the first person and the latent space vector of the facial image of the second person, and is changed or adjusted based on the distance between the facial image of the first person and the facial image of the second person. In some embodiments, the weighted triplet loss function is changed or adjusted so that the level of increasing the distance between the latent space vector of the voice sample of the first person and the latent space vector of the facial image of the second person is related to the distance (or inversely related to the similarity) between the facial image of the first person and the facial image of the second person. In some embodiments, the weighted triplet loss function is adjusted to be related to the distance between the facial image of the first person and the facial image of the second person. In some embodiments, the weighted triplet loss function is calculated according to Equation 1. In any case, the weighted triplet loss function is adjusted so that if the faces are similar the influence of the weighted triplet loss function on the training process is lower comparing to faces that are not similar.

In operation 650, the processor may train the voice-face matching model using the weighted triplet loss function. The training may include adjusting weights and other parameters of the voice-face matching model. For example, if the voice-face matching model includes a voice encoder and an image encoder, the weights and parameters of the voice encoder and image encoder may be adjusted. If the voice-face matching model includes a pretrained speaker recognition model followed by a voice feed forward neural network for processing the voice samples, and a pretrained face recognition model followed by an image feed forward neural network for processing the images, than the pretrained speaker recognition model and the pretrained face recognition model may not be affected by the current training, while the weights and parameters of the voice feed forward neural network and the image feed forward neural network may be adjusted in the training process. If the voice-face matching model includes a trainable decision logic, e.g., an ML model such as an NN of any applicable type, e.g., such as trainable decision logic 270, weights and parameters of the trainable decision logic may be adjusted as well. The training process may include verification as known in the art. Following operation 650, the voice-face matching model may be trained and ready for use.

Figure 7:
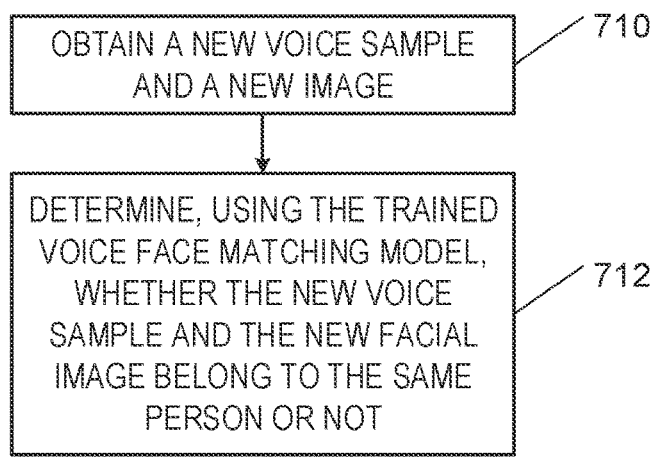
FIG. 7 is a flowchart of a method for matching a voice sample to a facial image using the trained voice-face matching model, according to embodiments of the invention.

Reference is now made to FIG. 7, which is a flowchart of a method for matching a voice sample to a facial image using the trained voice-face matching model, according to embodiments of the invention. While in some embodiments the operations of FIGS. 3 and 7 are carried out using systems as shown in FIG. 10, in other embodiments other systems and equipment can be used.

In operation 710, a processor (e.g., processor 705 depicted in FIG. 10), may obtain a pair of a new voice sample and a new facial image. In operation 712, the processor may match or correlate the new voice sample and new image, or determine that there is no match or correlation. For example, the processor may determine, using the trained voice-face matching model such as trained voice-face matching model 334, whether the new voice sample and the new facial image belong to the same person or not, and/or may provide a probability level that the new voice sample and a new facial image belong to the same person. For example, the processor may provide the new voice sample and the new facial image to the trained voice-face matching model as inputs, and the voice-face matching model may infer or predict whether the new voice sample and the new facial image belong to the same person (e.g. a match) or not (e.g. no match) or may provide the probability level. The prediction of the model may be provided to a human user or to other applications for further processing.

The probability measure may be used to sort a database of images in order of probability that the person in the image match a voice sample, e.g., by, for each image in the image database, providing the voice sample with the image to the trained voice-face matching model, obtaining a probability that the person in the image match a voice sample for each image and sorting the images in the order of probabilities. Similarly, the probability measure may be used to sort a database of voices in order of probability that the voice samples in the database match an image, e.g., by, for each voice sample in the database, providing the image with the voice sample to the trained voice-face matching model, obtaining a probability that the person in the image match the voice sample for each voice sample and sorting the voice samples in the order of probabilities.

Figure 8:
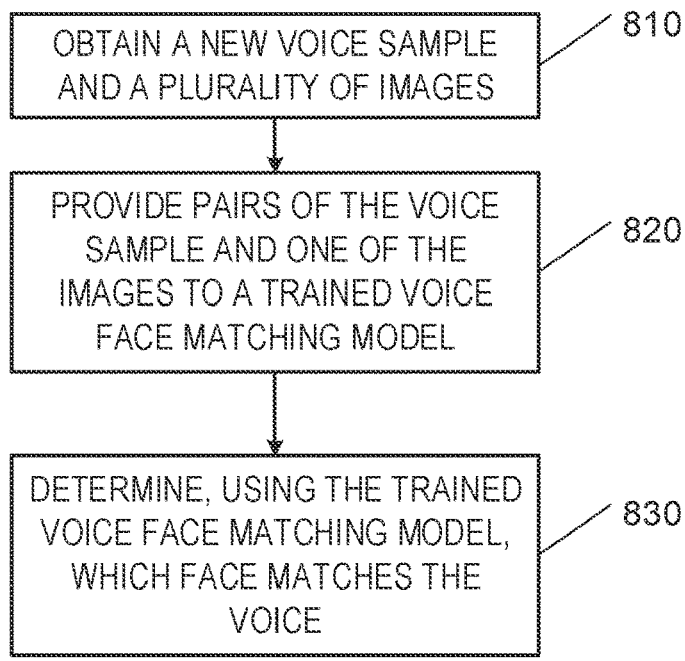
FIG. 8 is a flowchart of a method for matching a voice sample to a facial image from a plurality of facial images, using the trained voice-face matching model, according to embodiments of the invention.

Reference is now made to FIG. 8, which is a flowchart of a method for matching a voice sample to a facial image from a plurality of facial images, using the trained voice-face matching model, according to embodiments of the invention. While in some embodiments the operations of FIG. 8 are carried out using systems as shown in FIG. 10, in other embodiments other systems and equipment can be used.

In operation 810, a processor (e.g., processor 705 depicted in FIG. 10), may obtain a new voice sample and a plurality of facial images. In operation 820, the processor may provide pairs of the voice sample and one of the images of the plurality of facial images to a trained voice face matching model, e.g., trained voice-face matching model 334, in some embodiments, operation 820 may be repeated to all the images form the plurality of facial images. In operation 830, the processor may determine, using the trained voice face matching model, which face matches the voice, if any. For example, if the voice-face matching model determines that the voice sample and a face belong to the same person this may be the matching face. If the voice-face matching model determines that more than one face matches the voice, all matching faces may be provided as candidate matching faces, or the confidence score or probability level of the determination may be examined and the face with the highest confidence score or probability level may be determined to be the matching face. In cases where the voice-face matching model provides a matching score or a probability level between the voice and the face, the face with the highest matching score or probability level may be determined to be the matching face. The matching scores or probability levels and faces may be presented to a human user or provided to other applications for further processing.

Figure 9:
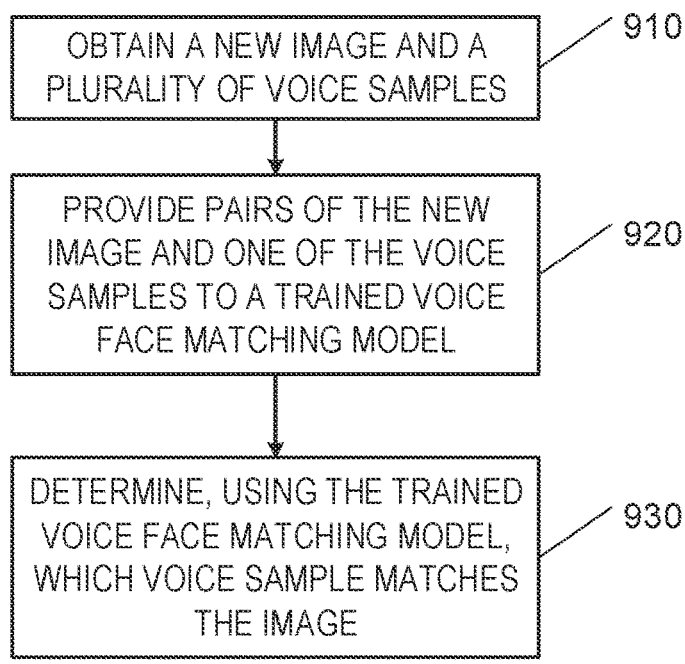
FIG. 9 which is a flowchart of a method for matching a facial image to a voice sample from a plurality of voice samples, using the trained voice-face matching model, according to embodiments of the invention.

Reference is now made to FIG. 9, which is a flowchart of a method for matching a facial image to a voice sample from a plurality of voice samples, using the trained voice-face matching model, according to embodiments of the invention. While in some embodiments the operations of FIG. 9 are carried out using systems as shown in FIG. 10, in other embodiments other systems and equipment can be used.

In operation 910, a processor (e.g., processor 705 depicted in FIG. 10), may obtain a new facial image and a plurality of voice samples. In operation 920, the processor may provide pairs of the new facial image and one of the voice samples of the plurality of voice samples to a trained voice face matching model, e.g., trained voice-face matching model 334, in some embodiments, operation 920 may be repeated to all the voice samples of the plurality of voice samples. In operation 930, the processor may determine, using the trained voice face matching model, which voice sample matches the new facial image, if any. For example, if the voice-face matching model determines that the voice sample and a face in the facial image belong to the same person this may be the matching voice. If the voice-face matching model determines that more than one voice sample matches the face, all matching voice samples may be provided as candidate matching voice samples, or the confidence score or probability level of the determination may be examined and the voice sample with the highest confidence score or probability level may be determined to be the matching voice. In cases where the voice-face matching model provides a matching score or a probability level between the voice and the face, the voice sample with the highest matching score or probability level may be determined to be the matching voice. The matching scores or probability levels and voices may be presented to a human user or provided to other applications for further processing.

FIG. 10 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as voice-face matching model 234 and loss calculation module 260, as shown in FIG. 2 and other modules or equipment mentioned herein may be or include, or may be executed by, a computing device such as included in FIG. 10 or specific components of FIG. 10, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g., code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, video, images, voice samples, triplets, training data, model weights and parameters etc. may be stored in a storage 730 and may be loaded from storage 730 into a memory 720 where it may be processed by processor 705. Some of the components shown in FIG. 10 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for matching a voice sample to a facial image, the method comprising, using a processor:
   obtaining a plurality of triplets, each comprising at least a voice sample of a first person, a facial image of the first person and a facial image of a second person;
   calculating a distance between the facial image of the first person and the facial image of the second person;
   using a voice-face matching model, calculating a latent space vector for the voice sample of the first person, a latent space vector for the facial image of the first person and a latent space vector for the facial image of the second person; and
   training the voice-face matching model using a weighted triplet loss function that decreases a distance between the latent space vector of the voice sample of the first person and the latent space vector of the facial image of the first person, and increases a distance between the latent space vector of the voice sample of the first person and the latent space vector of the facial image of the second person, wherein the weighted triplet loss function is adjusted based on the distance between the facial image of the first person and the facial image of the second person.

2. The method of claim 1, wherein the weighted triplet loss function is adjusted so that a level of increasing the distance between the latent space vector of the voice sample of the first person and the latent space vector of the facial image of the second person is related to the distance between the facial image of the first person and the facial image of the second person.

3. The method of claim 1, wherein the weighted triplet loss function is adjusted to be inversely related to the level of similarity between the facial image of the first person and the facial image of the second person.

4. The method of claim 1, wherein the distance is an inverse of a cosine similarity measure and the triplet loss function includes a non-decreasing function of an inverse of the cosine similarity measure.

5. The method of claim 1, wherein the latent space vector of the voice sample of the first person is calculated by a pretrained speaker recognition model, followed by a voice feed forward neural network, and wherein the latent space vector of the facial image of the first person and the latent space vector of the facial image of the second person are calculated by a pretrained face recognition model, followed by an image feed forward neural network.

6. The method of claim 1, wherein the triplet loss function is:

$$loss = \Sigma_k \max(\|emb_{voice}(v_i^k) - emb_{face}(f_i^k)\|^2 - \|emb_{voice}(v_i^k) - emb_{face}(f_j^k)\|^2 + \alpha, 0) \cdot f(d(emb_{face}^{pre}(f_i^k), emb_{face}^{pre}(f_j^k)))$$

Where:
$(v_i^k, f_i^k, f_j^k)$ is a triplet set used for the training,
$v_i^k$ is the voice sample of the first person,
$f_i^k$ is the facial image of the first person,
$f_j^k$ is the facial image of the second person,
$\alpha \in R$, is a margin constant,
$emb_{voice}(v_i^k)$ is the latent space vector of the voice sample,
$emb_{face}(f_i^k)$ is the latent space vector of the facial image of the first person,
$emb_{face}(f_j^k)$ is the latent space vector of the facial image of the second person,
$emb_{face}^{pre}(f_i^k)$ is a latent space vector of the facial image of the first person generated by a pretrained model,
$emb_{face}^{pre}(f_j^k)$ is a latent space vector of the facial image of the second person generated by a pretrained model, and
$d(emb_{face}^{pre}(f_i^k), emb_{face}^{pre}(f_j^k))$ is a distance between the image latent space vector generated by the pretrained model for the facial image of the first person $emb_{face}^{pre}(f_i^k)$ and the facial image of the second person $emb_{face}^{pre}(f_j^k)$.

7. The method of claim 1, comprising:
   obtaining a pair of a new voice sample and a new facial image to the trained voice-face matching model; and
   determining, using the trained voice-face matching model, whether the new voice sample and the new facial image belong to the same person or not.

8. A method for matching a voice sample to a facial image, the method comprising:
   calculating a distance between pairs of facial images in a database relating each of a plurality of facial images of one person, to a voice sample of the same person;
   calculating, by a voice subnetwork, a latent space vector for each of the voice samples in the database;
   calculating, by a face subnetwork, a latent space vector for each of the facial images in the database; and
   jointly training, using a weighted triplet loss function, the face subnetwork and the voice subnetwork, by for a plurality of triplets, each comprising a latent space vector of a voice sample of a first person, a latent space vector of a facial image of the first person and a latent space vector of a facial image of a second person, adjusting the weighted triplet loss function to decrease a distance between the latent space vector of the voice sample of the first person and the latent space vector of the facial image of the first person, and increase a distance between the latent space vector of the voice sample of the first person and the latent space vector of the facial image of the second person, wherein training comprises adjusting the weighted triplet loss function based on the distance between the facial image of the first person and the facial image of the second person.

9. The method of claim 8, wherein the weights are adjusted so that a level of increase in the distance between the latent space vector of the voice sample of the first person and the latent space vector of the facial image of the second person is positively related to the distance between the facial image of the first person and the facial image of the second person.

10. A system for matching a voice sample to a facial image, the system comprising:
    a memory; and
    a processor configured to:
    obtain a plurality of triplets, each comprising at least a voice sample of a first person, a facial image of the first person and a facial image of a second person;
    calculate a distance between the facial image of the first person and the facial image of the second person;
    using a voice-face matching model, calculate a latent space vector for the voice sample of the first person, a latent space vector for the facial image of the first person and a latent space vector for the facial image of the second person; and
    train the voice-face matching model using a weighted triplet loss function that decreases a distance between the latent space vector of the voice sample of the first person and the latent space vector of the facial image of the first person, and increases a distance between the latent space vector of the voice sample of the first person and the latent space vector of the facial image of the second person, wherein the weighted triplet loss function is adjusted based on the distance between the facial image of the first person and the facial image of the second person.

11. The system of claim 10, wherein the processor is further configured to adjust the weighted triplet loss function so that a level of increasing the distance between the latent space vector of the voice sample of the first person and the latent space vector of the facial image of the second person is related to the distance between the facial image of the first person and the facial image of the second person.

12. The system of claim 10, wherein the processor is further configured to adjust the weighted triplet loss function to be inversely related to the level of similarity between the facial image of the first person and the facial image of the second person.

13. The system of claim 10, wherein the distance is an inverse of a cosine similarity measure and the triplet loss function includes a non-decreasing function of an inverse of the cosine similarity mea sure.

14. The system of claim 10, wherein the processor is further configured to calculate the latent space vector of the voice sample of the first person by a pretrained speaker recognition model, followed by a voice feed forward neural network, and wherein the processor is further configured to calculate the latent space vector of the facial image of the first person and the latent space vector of the facial image of the second person by a pretrained face recognition model, followed by an image feed forward neural network.

15. The system of claim 10, wherein the triplet loss function is:

loss=$\Sigma_k \max(\|emb_{voice}(v_i^k) - emb_{face}(f_i^k)\|^2 - \|emb_{voice}(v_i^k) - emb_{face}(f_j^k)\|^2 + \alpha, 0) \cdot f(d(emb_{face}^{pre}(f_i^k), emb_{face}^{pre}(f_j^k)))$ Where:

($v_i^k$, $f_i^k$, $f_j^k$) is a triplet set used for the training, $v_i^k$ is the voice sample of the first person, $f_i^k$ is the facial image of the first person, $f_j^k$ is the facial image of the second person, $\alpha \in R$, is a margin constant, $emb_{voice}(v_i^k)$ is the latent space vector of the voice sample, $emb_{face}(f_i^k)$ is the latent space vector of the facial image of the first person, $emb_{face}(f_j^k)$ is the latent space vector of the facial image of the second person, $emb_{face}^{pre}(f_i^k)$ is a latent space vector of the facial image of the first person generated by a pretrained model, $emb_{face}^{pre}(f_j^k)$ is a latent space vector of the facial image of the second person generated by a pretrained model, and $d(emb_{face}^{pre}(f_i^k), emb_{face}^{pre}(f_j^k))$ is a distance between the image latent space vector generated by the pretrained model for the facial image of the first person $emb_{face}^{pre}(f_i^k)$ and the facial image of the second person $emb_{face}^{pre}(f_j^k)$.

16. The system of claim 10, wherein the processor is farther configured to:

obtain a pair of a new voice sample and a new facial image to the trained voice-face matching model; and determine, using the trained voice-face matching model, whether the new voice sample and the new facial image belong to the same person or not.

* * * * *